(12) United States Patent
Amit

(10) Patent No.: US 9,164,247 B2
(45) Date of Patent: Oct. 20, 2015

(54) APPARATUSES FOR REDUCING THE SENSITIVITY OF AN OPTICAL SIGNAL TO POLARIZATION AND METHODS OF MAKING AND USING THE SAME

(75) Inventor: Moshe Amit, Los Angeles, CA (US)

(73) Assignee: Source Photonics, Inc., Chatsworth, CA (US)

( * ) Notice: Subject to any disclaimer, the term of this patent is extended or adjusted under 35 U.S.C. 154(b) by 583 days.

(21) Appl. No.: 13/193,518

(22) Filed: Jul. 28, 2011

(65) Prior Publication Data

US 2013/0028611 A1    Jan. 31, 2013

(51) Int. Cl.
  G02B 27/26    (2006.01)
  G02B 17/00    (2006.01)
  H04B 10/00    (2013.01)
  G02B 6/42     (2006.01)

(52) U.S. Cl.
  CPC .................................. G02B 6/4201 (2013.01)

(58) Field of Classification Search
  CPC .............................. G02B 27/26; G02B 17/00
  USPC ...................................................... 385/93, 67
  See application file for complete search history.

(56) References Cited

U.S. PATENT DOCUMENTS

| 3,934,225 | A | * | 1/1976 | de Possel .................... 382/204 |
| 5,204,922 | A | * | 4/1993 | Weir et al. ..................... 385/18 |
| 5,292,685 | A | * | 3/1994 | Inoguchi et al. .............. 438/32 |
| 5,343,486 | A | * | 8/1994 | Itaya et al. ................ 372/43.01 |
| 5,448,581 | A | * | 9/1995 | Wu et al. .................. 372/45.01 |
| 5,621,551 | A | * | 4/1997 | Henderson et al. ............. 349/7 |
| 5,970,081 | A | * | 10/1999 | Hirayama et al. ............. 372/96 |
| 6,067,157 | A | * | 5/2000 | Altendorf ..................... 356/337 |
| 6,151,347 | A | * | 11/2000 | Noel et al. ................. 372/45.01 |
| 6,455,338 | B1 | * | 9/2002 | Takagi et al. .................. 438/24 |
| 6,477,191 | B1 | * | 11/2002 | Okada et al. .............. 372/50.11 |
| 7,140,131 | B2 | * | 11/2006 | Kimura ........................... 38/18 |
| 7,194,016 | B2 | * | 3/2007 | Bullington et al. .......... 372/108 |
| 7,372,039 | B2 | * | 5/2008 | Tokhtuev et al. ............ 250/373 |

(Continued)

FOREIGN PATENT DOCUMENTS

JP    2006184759 A    *    7/2006

OTHER PUBLICATIONS

Moshe Amit; "Optical Receiver with Reduced Cavity Size and Methods of Making and Using the Same"; U.S. Appl. No. 13/212,137, filed Aug. 17, 2011.

(Continued)

Primary Examiner — Kaveh Kianni
(74) Attorney, Agent, or Firm — Andrew D. Fortney; Central California IP Group, P.C.

(57) ABSTRACT

Methods and apparatuses for reducing the sensitivity of an optical signal to polarization. The method generally includes (i) reflecting the optical signal from a first mirror at a first angle relative to the optical signal to a second mirror at a second angle, and (ii) further reflecting the reflected optical signal from the second mirror to a receiver. The apparatus generally comprises (i) a first mirror at a first angle relative to an incident optical signal and configured to reflect the incident optical signal, (ii) a second mirror at a second angle configured to further reflect the reflected optical signal to a first receiver, and (iii) a lens configured to focus and/or collimate the optical signal or the reflected optical signal. The first angle is configured to reduce polarization of the reflected optical signal, thereby maximizing the intensity or power of the optical signal.

20 Claims, 3 Drawing Sheets

(56) References Cited

U.S. PATENT DOCUMENTS

| | | | |
|---|---|---|---|
| 7,553,774 B2* | 6/2009 | Nomaguchi | 438/725 |
| 7,586,970 B2* | 9/2009 | Kanskar et al. | 372/96 |
| 8,364,222 B2* | 1/2013 | Cook et al. | 600/323 |
| 2002/0114566 A1* | 8/2002 | Fairchild et al. | 385/33 |
| 2002/0192849 A1* | 12/2002 | Bullington et al. | 438/22 |
| 2002/0192850 A1* | 12/2002 | Stoltz et al. | 438/22 |
| 2003/0007234 A1* | 1/2003 | Holmes | 359/290 |
| 2003/0147617 A1* | 8/2003 | Park et al. | 385/131 |
| 2003/0152336 A1* | 8/2003 | Gurevich et al. | 385/88 |
| 2003/0161573 A1* | 8/2003 | Ishida et al. | 385/14 |
| 2003/0198029 A1* | 10/2003 | Zaremba | 361/752 |
| 2004/0032650 A1* | 2/2004 | Lauer | 359/385 |
| 2004/0165637 A1* | 8/2004 | Bullington et al. | 372/50 |
| 2005/0219704 A1* | 10/2005 | Shirasaki et al. | 359/589 |
| 2005/0226587 A1* | 10/2005 | Minota et al. | 385/134 |
| 2007/0104417 A1* | 5/2007 | Tanaka et al. | 385/16 |
| 2007/0146869 A1* | 6/2007 | Lauer | 359/368 |
| 2009/0219539 A1* | 9/2009 | Myrick et al. | 356/445 |
| 2010/0099209 A1* | 4/2010 | Behfar et al. | 438/29 |
| 2010/0253769 A1* | 10/2010 | Coppeta et al. | 348/58 |
| 2010/0256469 A1* | 10/2010 | Cook et al. | 600/323 |
| 2010/0290128 A1* | 11/2010 | Sugitatsu | 359/634 |
| 2010/0322557 A1* | 12/2010 | Matsuda et al. | 385/37 |
| 2011/0317093 A1* | 12/2011 | Medendorp et al. | 349/61 |
| 2012/0002285 A1* | 1/2012 | Matsuda | 359/576 |
| 2013/0188191 A1* | 7/2013 | Freese et al. | 356/446 |

OTHER PUBLICATIONS

Moshe Amit; "Optical Transmitter Assembly, Optical Transceivers Including the Same, and Methods of Making and Using Such Optical Transmitter Assemblies and Optical Transceivers", U.S. Appl. No. 13/223,150, filed Aug. 31, 2011.

J. M. Trewhella, G. W. Johnson, W. K. Hogan and D. L. Karst; "Evolution of Optical Subassemblies in IBM Data Communication Transceivers"; IBM J. Res. & Dev. vol. 47, No. 2/3, Mar./May 2003; pp. 251-258; International Business Machines Corporation, Fishkill, New York.

* cited by examiner

US 9,164,247 B2

APPARATUSES FOR REDUCING THE SENSITIVITY OF AN OPTICAL SIGNAL TO POLARIZATION AND METHODS OF MAKING AND USING THE SAME

FIELD OF THE INVENTION

The present invention generally relates to optical signal transmission and/or reception. More specifically, embodiments of the present invention pertain to methods and apparatuses for reducing the sensitivity of optical signals to polarization (e.g., in optical receivers or transceivers).

DISCUSSION OF THE BACKGROUND

A light wave is plane-polarized or linearly polarized when all of the electric field vectors in the light wave perpendicular to the direction of wave travel lie in a given plane. The orientation of the given plane is the direction of polarization. For example, a horizontally polarized light wave has a vertical amplitude of zero, and a vertically polarized light wave has a horizontal amplitude of zero. An unpolarized light wave is one that propagates in more than one plane. Polarization of a light wave (e.g., an optical signal) can occur when a light wave is reflected off a non-metallic medium (e.g., a beam splitter), forming a reflected light wave and a refracted light wave. When polarization occurs via reflection (e.g., from a mirror), the extent to which the polarization occurs is dependent on the angle at which the light approaches the medium.

In many devices configured to receive and/or transmit an optical signal (e.g., a data, voice and/or video signal in an optical or optoelectronic network), polarization can play an important role in the effective transmission of an optical signal. For example, as shown in FIG. 1, a conventional optical receiver 100 comprises an optical fiber (not shown), a lens 110 (optional), a mirror 120, a filter 130, and a receiver 140. As shown, lens 110 receives a light signal IN (e.g., from the optical fiber) and provides a focused light signal 150 to mirror 120. Mirror 120 then reflects the light signal 150 to receiver 140 in the form of a reflected light signal 155 for further processing. The reflected light signal 155 may pass through filter 130 before being received in the receiver 140. Reflected light signal 155 is at least partially polarized (e.g., having electric field vectors in planes at certain angles with reduced amplitudes).

As shown, mirror 120 is positioned at a 45° angle (i.e., the angle of incidence) with respect to optical signal 150. When optical signal 150 travels from a first material (e.g., the air between lens 110 and mirror 120) having a first index of refraction ($n_1$) to a second material (e.g., mirror 120) having a second index of refraction greater than the first index of refraction ($n_2$), a portion of the optical signal 150 is refracted into the second material 120 and a portion of the optical signal 150 is reflected back into the first material (e.g., towards receiver 140). For optical signals reflected by non-metallic surfaces, if the angle of incidence is such that the reflected and the refracted rays are at the Brewster angle (i.e., $\tan^{-1}[n_2/n_1]$), the reflected ray is linearly polarized parallel to the reflective surface. Thus, the intensity ($I_1$) of the transmitted signal (e.g., the reflected optical signal 155) can be calculated according to Equation [1] below:

$$I_1 = I \cos^2(\theta) \quad [1]$$

where I is the intensity of the incident optical signal 150, and $\theta$ is the angle of incidence of optical signal 150. Thus, as $\theta$ approaches 90°, the value of $\cos^2(\theta)$ approaches zero such that the intensity of the reflected signal decreases and the degree of polarization increases (e.g., up to 100% polarization). Furthermore, placing a mirror at a 45° angle in an optical receiver requires precise positioning during the manufacturing process, and slight variations in the angle of the mirror can greatly affect the degree of polarization (and thus the amount of lost intensity) in the reflected light wave(s).

This "Background" section is provided for background information only. The statements in this "Background" are not an admission that the subject matter disclosed in this "Background" section constitutes prior art to the present disclosure, and no part of this "Background" section may be used as an admission that any part of this application, including this "Background" section, constitutes prior art to the present disclosure.

SUMMARY OF THE INVENTION

Embodiments of the present invention relate to methods and apparatuses for reducing the sensitivity of an optical signal to polarization. In one aspect, the invention concerns a method of receiving an optical signal, comprising reflecting the optical signal from a first mirror to a second mirror, and further reflecting the reflected optical signal from the second mirror to a receiver. The first mirror is at a first angle relative to the optical signal, and the second mirror is at a second angle relative to the optical signal reflected by the first mirror. The first angle is configured to reduce polarization of the reflected optical signal relative to a single mirror positioned at a 45° angle relative to the optical signal. In general, the second angle is greater than the first angle. In certain implementations, the sum of the first and the second angles is about 45°.

In various embodiments, the method may further comprise (i) passing the optical signal or the reflected optical signal through a first lens to provide a focused and/or collimated optical signal; (ii) passing the optical signal or the reflected optical signal through a filter configured to reduce or narrow a bandwidth of the optical signal or the reflected optical signal; and/or (iii) even further reflecting the further reflected optical signal (i.e., the optical signal reflected by the second mirror) from one or more third mirrors to the receiver. In other embodiments (e.g., multi-channel embodiments), the first mirror reflects light having a first wavelength and allows light having at least a second wavelength to pass through, and the method may further comprise reflecting a portion of the optical signal having the second wavelength from a third mirror at the first angle to a fourth mirror at the second angle, and further reflecting the reflected optical signal having the second wavelength from the fourth mirror to a second receiver.

In another aspect, the invention concerns an apparatus (e.g., an optical receiver or transceiver assembly, such as a receiver optical subassembly [ROSA], etc.) comprising a first mirror at a first angle, configured to reflect an incident optical signal; a second mirror at a second angle, configured to further reflect the reflected optical signal to a first receiver; and a lens configured to focus and/or collimate the optical signal or the reflected optical signal. As for the method, the first angle is relative to the optical signal, the second angle is relative to the reflected optical signal (i.e., the optical signal reflected by the first mirror), and the first angle is configured to reduce polarization of the reflected optical signal relative to a single mirror positioned at a 45° angle relative to the optical signal.

In further embodiments, the apparatus further comprises one or more third mirrors configured to even further reflect the further reflected optical signal (i.e., reflected by the second mirror) to the receiver, and/or a filter configured to reduce or narrow a wavelength band of the incident optical signal, reflected optical signal, and/or focused and/or collimated optical signal. In certain embodiments (e.g., multi-channel embodiments) of the apparatus, the first mirror reflects light having a first wavelength and allows light having at least a second wavelength to pass through, and the apparatus may further comprise (i) a third mirror configured to reflect a portion of the incident optical signal having the second wavelength at the first angle and (ii) a fourth mirror configured to further reflect the reflected optical signal having the second wavelength at the second angle to a second receiver. In such multi-channel embodiments, the apparatus may further comprise a second filter configured to reduce or narrow a wavelength band of the portion of the optical signal having the second wavelength.

Another aspect of the invention concerns a transceiver comprising the above apparatus, a receiver, and a transmitter configured to provide an output optical signal (e.g., to an optical medium carrying the incident optical signal). Thus, the transceiver may further comprise an optical fiber providing the incident optical signal. In some embodiments of the transceiver, the first mirror may be configured to reflect light having a first wavelength and allow light having a second wavelength different from the first wavelength to pass through. In such embodiments, the output optical signal has the second wavelength, and the transmitter is configured to transmit the output optical signal through the first mirror. In general, the receiver may comprise (i) a photodiode configured to receive the reflected and focused and/or collimated optical signal, and (ii) circuitry in electrical communication with the photodiode.

The method of manufacturing the apparatus generally comprises (i) affixing or securing a first mirror at a first angle relative to an incident optical signal within the housing of the apparatus or into an opening in the housing of the apparatus, the first angle being configured to reduce polarization of the reflected optical signal relative to a single mirror configured to reflect the optical signal at a 45° angle relative to the optical signal, (ii) affixing or securing a second mirror within the housing of the apparatus, the second mirror being configured to further reflect the reflected optical signal to a first receiver at a second angle relative to the reflected optical signal, and (iii) affixing or securing a lens within the housing of the apparatus or onto a receiving device in the apparatus, the lens being configured to focus and/or collimate the optical signal or the reflected optical signal.

In various embodiments, the method of manufacturing the apparatus may further comprise affixing or securing one or more third mirrors (as described above) within the housing of the apparatus. In further embodiments, the method of manufacturing the apparatus may further comprise affixing or mounting a first filter to or within the housing of the apparatus, the first filter configured to reduce or narrow a wavelength band of the incident optical signal, the reflected optical signal, and/or the focused and/or collimated optical signal. Additionally, the method of manufacturing the apparatus may further comprise affixing or mounting a second filter to or within the housing of the apparatus, the second filter configured to reduce or narrow a wavelength band of the portion of the optical signal having the second wavelength around the second wavelength.

The present invention advantageously reduces or minimizes the sensitivity of an optical signal to polarization, thereby maximizing the intensity or power of the optical signal. By utilizing a mirror positioned at an angle less than that of conventional optics, and in conjunction with a second mirror (and one or more optional third mirrors), an optical signal can be provided to an optoelectronic receiver and/or transceiver with a minimal degree of polarization, thereby maximizing the power and/or intensity of the optical signal. These and other advantages of the present invention will become readily apparent from the following description of various embodiments.

DETAILED DESCRIPTION

Figure 1:
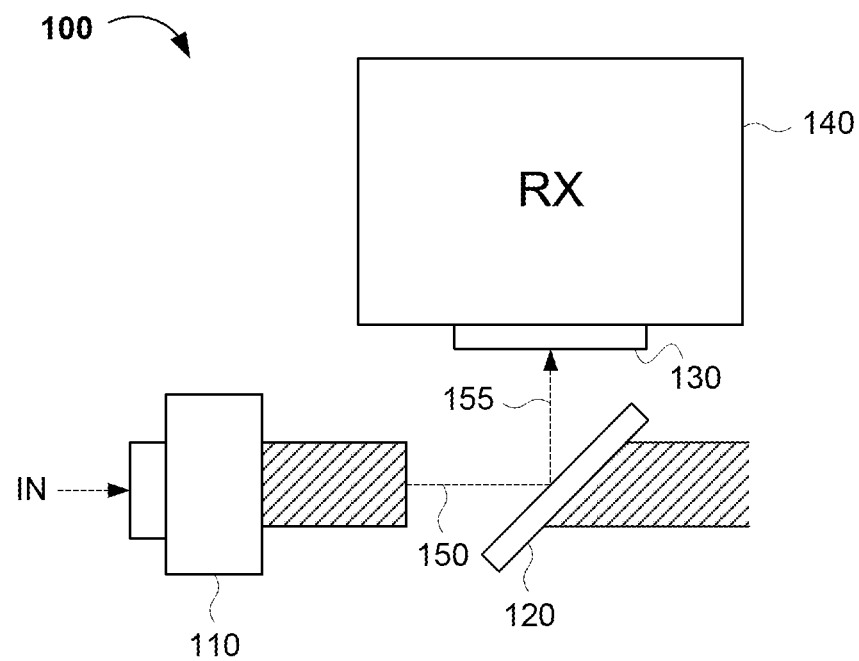
FIG. 1 is a diagram illustrating conventional optics for receiving an optical signal.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For the sake of convenience and simplicity, the terms "optical" and "optoelectronic" are generally used interchangeably herein, and use of any one of these terms also includes the others, unless the context clearly indicates otherwise. Similarly, the terms "optical signal," "light signal," "light wave," and "light beam" are generally used interchangeably herein, and use of any one of these terms also includes the others, unless the context clearly indicates otherwise. Also, for convenience and simplicity, the terms "connected to," "coupled with," "coupled to," and "in communication with" (which terms also refer to direct and/or indirect relationships between the connected, coupled and/or communicating elements unless the context of the term's use unambiguously indicates otherwise) may be used interchangeably, but these terms are also generally given their art-recognized meanings.

The present invention concerns methods and apparatuses for reducing the sensitivity of an optical signal to polarization, and enjoys particular advantages in optical receivers and transceivers. The present method and apparatus can be used to minimize the sensitivity of an optical signal or other light wave to polarization, thereby maximizing the bandwidth, power and/or intensity of the optical signal or light wave. Conventional optical assemblies provide an optical signal to a receiver at a relatively large angle (e.g., 45°) with respect to the received optical signal. As a result, the optical signal provided to the receiver is highly sensitive to polarization. A high sensitivity to polarization can easily and inadvertently reduce the power of the optical signal, thereby reducing the efficiency of the optical signal processor, and possibly requiring an increase in the optical signal power to compensate for power and bandwidth loss. Additionally, such conventional optical assemblies must be manufactured according to precise geometric considerations (e.g., placement of the mirror at a 45° angle), which can increase manufacturing costs. The present methods and apparatuses reduce or minimize the sensitivity of an optical signal to polarization, thereby improving optical and optoelectronic receiver, transceiver and network performance, and enabling reductions in the manufacturing costs of devices containing optical signal receivers.

The invention, in its various aspects, will be explained in greater detail below with respect to exemplary embodiments.

A First Exemplary Optical Signal Assembly

Figure 2:
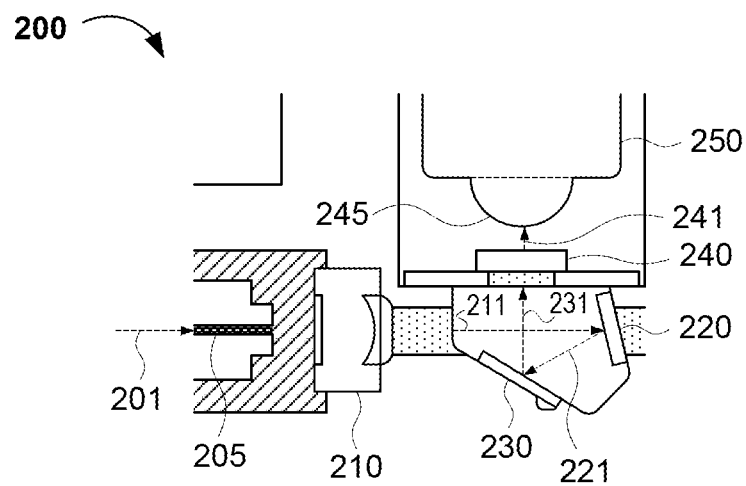
FIG. 2 illustrates a first exemplary optical signal assembly according to the present invention.

FIG. 2 illustrates a first exemplary optical signal assembly 200 (e.g., within an optical transceiver, not shown) according to the present invention. As shown, optical signal assembly 200 comprises an optical signal medium (e.g., fiber optic cable or other optical fiber) 205, first and second lenses 210 and 245, filter 240, first and second mirrors 220 and 230, and receiver 250. As shown, lens 210 receives an input (e.g., an incident light signal, a collimated light signal, etc.) 201 from optical signal medium 205. Optical signal 201 can be provided via a transmitter (e.g., elsewhere in an optical or optoelectronic network) configured to transmit the optical signal to optical signal medium 205. Lens 210 is configured to provide a focused and/or collimated light signal 211 to first mirror 220. In one embodiment, optical signal 201 is a collimated beam, and lens 210 further collimates the optical signal 201 to reduce or minimize any loss of collimation in the optical signal 201 that may have occurred during signal transmission. The first mirror 220 has a surface that reflects at least part of the light beam 211 having a wavelength or wavelength band to be processed by receiver 250. In the example shown in FIG. 2, first mirror 220 can reflect substantially all of the light beam 211. In another embodiment, first mirror 220 is a dichroic mirror or other beam splitter (e.g., a long wave pass [LWP] dichroic mirror, short wave pass [SWP] dichroic mirror, etc.). In alternative embodiments, first mirror 220 is a wavelength selective filter (e.g., made of or coated with a reflective material), a polarization filter (e.g., configured to increase the degree of polarization of the optical signal 211), an amplitude modulation mask, a phase modulation mask, a hologram, and/or a grating.

The light signal 221 reflected from the first mirror 220 is further reflected by the second mirror 230 to receiver 250. Second mirror 230 is configured to reflect substantially all of the optical signal 221. Prior to entering the receiver 250, optical signal 231 passes through filter 240 (e.g., a bandpass filter) and lens 245. Filter 240 is generally configured to narrow or reduce a wavelength band of optical signal 231 and provide a filtered optical signal 241. The filter 240 can be placed elsewhere along the light path (e.g., between first mirror 220 and second mirror 230, between lens 245 and receiver 250, etc.). Lens 245 then provides an optical input signal (not shown) to receiver 250. As shown in FIG. 2, lens 245 is a half-ball lens, but it can also comprise, e.g., a concave lens, a convex lens and/or a combination of concave and convex lenses. Receiver 250 can comprise a photodiode or any other device configured to convert an optical signal into an electrical signal. In one embodiment, receiver 250 comprises (i) a photodiode configured to receive an optical signal and convert the optical signal into an electrical signal, and (ii) circuitry in electrical communication with the photodiode (e.g., a transimpedance amplifier and/or a limiting amplifier) configured to process (e.g., amplify) the converted electrical signal.

As shown, first mirror 220 is positioned at a first predetermined angle (e.g., 13°±x°, where x=3 or any positive number less than 3]) with respect to optical signal 211. That is, optical signal 211 has an angle of incidence of about 13° on the first mirror 220. In one embodiment, first mirror 220 is at an angle of exactly 13° with respect to optical signal 211. The first predetermined angle is configured to reduce polarization of the reflected optical signal 231 relative to a single mirror positioned at a 45° angle relative to optical signal 211 (e.g., as shown in FIG. 1). Similarly, second mirror 230 is positioned at a second predetermined angle (e.g., from about 15° to about 60°) with respect to optical signal 221. More particularly, second mirror 230 is at an angle of 32°±y°, where y=4 (or any positive number less than 4°) with respect to optical signal 221. That is, optical signal 221 has an angle of incidence of about 32° on the second mirror 230. In one embodiment, the second predetermined angle is exactly 32°. In addition, depending on the relative positions and orientations of optical medium 205, lens 210 and receiver 250, the sum of (i) the angle of incidence of optical signal 211 on the first mirror 220 and (ii) the angle of incidence of the optical signal 221 on the second mirror 230 may be from about 30° to about 75°. More particularly, the sum of the angles of incidence of light on the two mirrors 220 and 230 may be, e.g., 45°±z°, where z=5 or any positive number less than 5°. That is, the sum of the first and the second predetermined angles may be about 45°. In the embodiment shown in FIG. 2, it is exactly 45°.

Thus, exemplary optical assembly 200 advantageously reduces or minimizes the sensitivity of an optical signal (e.g., optical signal 211) to polarization, thereby maximizing the intensity or power of the optical signal. By utilizing a mirror (e.g., first mirror 220) positioned at an angle less than that of conventional optics, and "folding" a light beam away from a light-receiving unit, an optical signal can be provided to an optoelectronic receiver and/or transceiver with a minimal impact on the degree of polarization, thereby maximizing the power and/or intensity of the optical signal.

A Second Exemplary Optical Signal Assembly

Figure 3:
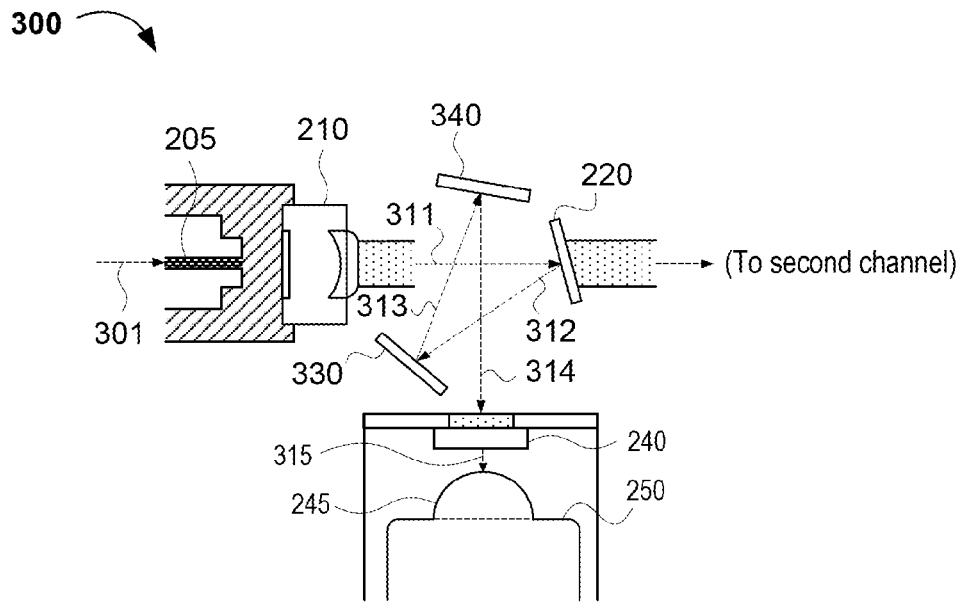
FIG. 3 illustrates a second exemplary optical signal assembly according to the present invention.

FIG. 3 illustrates a second exemplary optical signal assembly 300 according to the present invention. As shown, optical signal assembly 300 comprises structures similar to that of optical assembly 200 of FIG. 2, wherein structures having the same identification numbers discussed below with respect to FIG. 3 may be substantially the same as those discussed above with respect to FIG. 2.

As shown, optical signal assembly 300 comprises optical signal medium 205, first and second lenses 210 and 245, filter 240, first mirror 220, second mirror 330, third mirror 340, and receiver 250. As shown, lens 210 receives an optical input signal (e.g., a collimated signal) 301 from optical signal medium 205 and provides a focused and/or collimated light signal 311 to first mirror (e.g., a dichroic mirror or other beam splitter, a reflective polarization filter, etc.) 220. As shown in FIG. 3, first mirror 220 reflects part of the optical signal 311 to second mirror 330, which reflects substantially all of the reflected optical signal 312 to third mirror 340. Third mirror 340 reflects the twice-reflected optical signal 313 to receiver 250. Prior to entering the receiver 250, optical signal 314 passes through filter 240 (e.g., a bandpass filter) and lens 245. Lens 245 may be configured to focus the filtered optical signal 315 onto a light-receiving device (e.g. a photodiode) in receiver 250.

As shown, first mirror 220 is positioned at a first predetermined angle with respect to optical signal 311. As for the embodiment shown in FIG. 2, first mirror 220 may be positioned at an angle of about 13° with respect to optical signal 311. Additionally, second mirror 330 is positioned at a second predetermined angle with respect to optical signal 312. Depending on the relative positions and orientations of optical medium 205, lens 210 and receiver 250, the second predetermined angle may be from about 10° to about 45°. In one embodiment, the angle of incidence of optical signal 312 on second mirror 330 can be 16°±m°, where m=6 or any positive number less than 6. In one example, the angle of incidence of optical signal 312 on second mirror 330 is 16°. Thus, is some embodiments, the angle of incidence of optical signal 312 on second mirror 330 is greater than the angle of incidence of the received optical signal 311 on first mirror 220. Alternatively, in certain cases, it may be beneficial to reduce or minimize the sensitivity of the reflected signal 312 to polarization, in which case the angle of incidence of optical signal 312 on second mirror 330 may be about 13° (e.g., exactly 13°), or the same as the angle of incidence of received optical signal 311 on first mirror 220.

Furthermore, third mirror 340 is positioned at a third predetermined angle with respect to optical signal 313. Also depending on the relative positions and orientations of optical medium 205, lens 210 and receiver 250, the third predetermined angle may also be from about 10° to about 45°. In one embodiment, the angle of incidence of optical signal 313 on third mirror 340 can also be 16°±m°, where m=6 or any positive number less than 6. In one example, the angle of incidence of optical signal 313 on third mirror 340 is 16°. Thus, is some embodiments, the angle of incidence of optical signal 313 on third mirror 340 is greater than the angle of incidence of the received optical signal 311 on first mirror 220 and the same as the angle of incidence of optical signal 312 on second mirror 330. Alternatively, when it is beneficial to reduce or minimize the sensitivity of the reflected signal 312 to polarization, the angle of incidence of optical signal 313 on third mirror 340 may be about 19° (e.g., exactly 19°).

Similar to the arrangement shown in FIG. 2, the sum of (i) the angle of incidence of optical signal 311 on the first mirror 220, (ii) the angle of incidence of the optical signal 312 on the second mirror 330, and (iii) the angle of incidence of the optical signal 313 on the third mirror 340 may be from about 30° to about 75°. More particularly, the sum of the angles of incidence of light on the three mirrors 220, 330 and 340 may be, e.g., 45°±z°, where z=5 or any positive number less than 5°. That is, the sum of the first, second and third predetermined angles may be about 45°. In the embodiment shown in FIG. 3, it is 45°.

By utilizing one or more mirrors (e.g., first mirror 220, and optionally, second and/or third mirrors 330 and 340) positioned at an angle configured to reduce the sensitivity of an optical signal or other light beam to polarization (and generally less than that of conventional optics), the power and/or intensity of the optical signal may be maximized or at least increased relative to the conventional configuration of FIG. 1.

A Method of Receiving an Optical Signal

Figure 4:
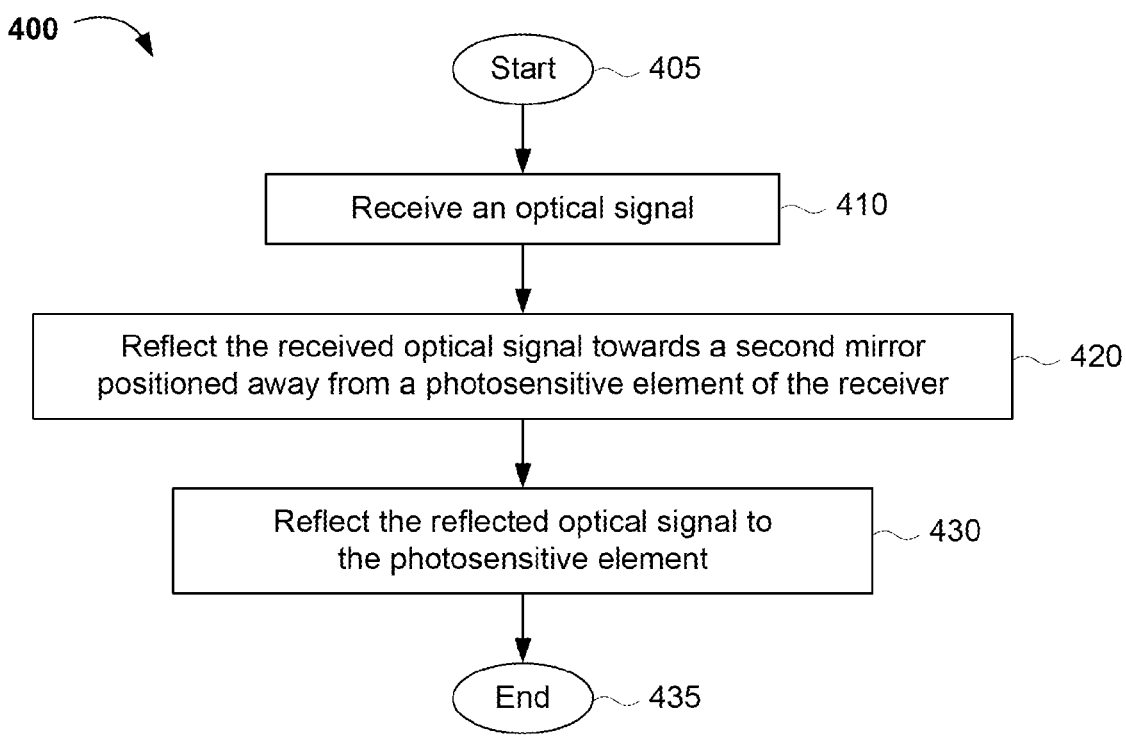
FIG. 4 is a flowchart showing an exemplary method for receiving an optical signal.

As shown in FIG. 4, flowchart 400 illustrates an exemplary method for receiving an optical signal. As shown, at 405 the method begins, and at 410, an optical signal is received (e.g., in the optical assembly 200 in FIG. 2). In some embodiments, the optical signal is received over an optical signal medium (e.g., a fiber optic cable) from an optical transmitter in an optical or optoelectronic network. In some embodiments, the received optical signal can be a collimated or polarized optical signal. In addition, the optical signal may be passed through a lens to provide a focused and/or collimated optical signal, and the received optical signal may be focused onto a first mirror. The first mirror is generally positioned at an angle with respect to the received optical signal, configured to reduce or minimize the sensitivity of the received optical signal to polarization (e.g., about 13°), relative to a single mirror positioned at a 45° angle relative to the received optical signal. In some embodiments, the first mirror is a dichroic mirror or other beam splitter, which enables the method to further comprise passing part of the received optical signal to a second receiver unit for processing therein.

At 420, the received optical signal is reflected towards a second mirror positioned away from a photosensitive element of the receiver. Such an arrangement may be counterintuitive, given a presumption that the most effective optical signal transfer mechanism in an optical receiver or transmitter has the shortest and/or most direct light path from the optical medium to the receiver (e.g., FIG. 1). In some embodiments, the sum of the angles of incidence at the first and second mirrors is about 45°.

At 430, the optical signal reflected by the second mirror is further reflected to the photosensitive element. In some embodiments, the method further comprises passing the further reflected optical signal to a filter (e.g., configured to narrow a bandwidth of the optical signal). In further embodiments, the method further comprises focusing the further reflected optical signal (filtered or unfiltered) using a second lens. The second lens may be configured to focus the optical signal onto a light-receiving element such as a photodiode in the receiver. Additionally, the method can further comprise even further reflecting the twice-reflected optical signal to the receiver using one or more third mirrors. At 435, the method ends.

An Exemplary Multi-Channel Optical Signal Assembly Apparatus

Figure 5:
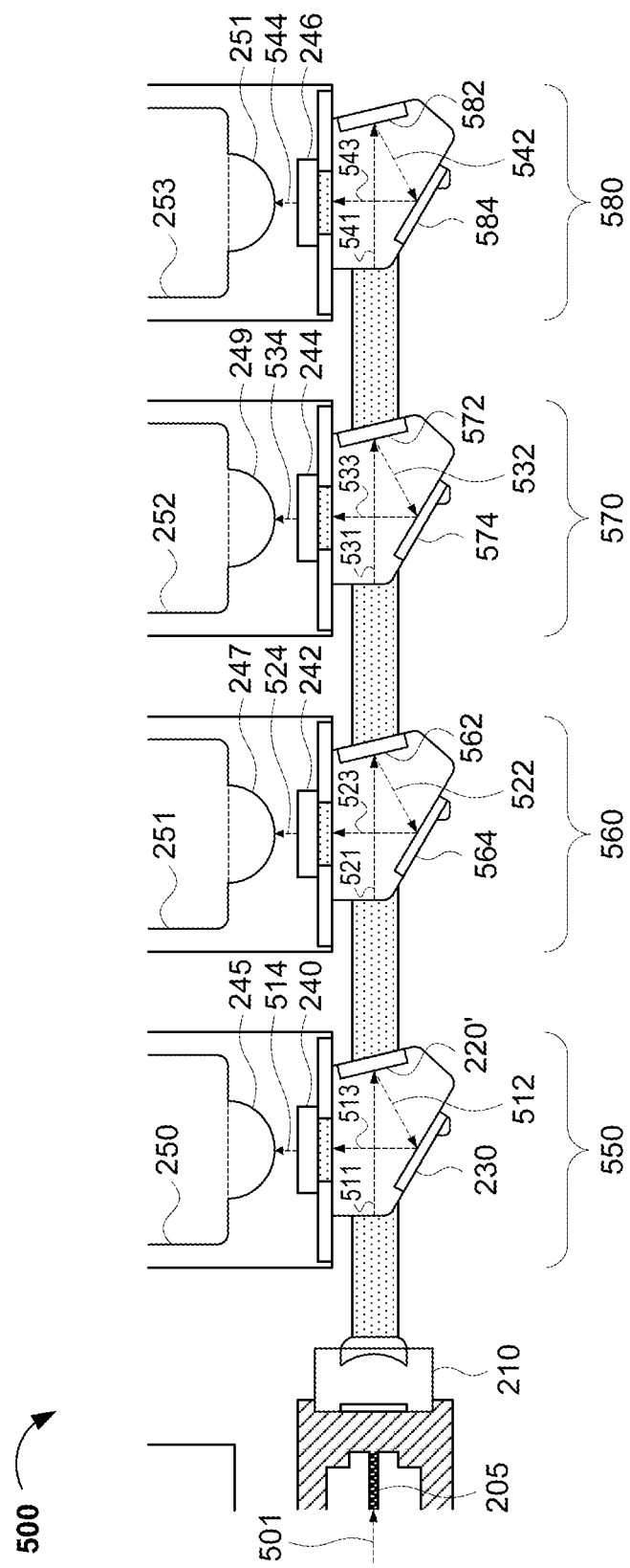
FIG. 5 illustrates an exemplary multiple channel optical signal assembly configuration according to the present invention.

As shown in FIG. 5, an exemplary multiple-channel optical signal assembly apparatus 500 utilizes a plurality of optical assemblies (e.g., optical signal assemblies 550, 560, 570, and 580) to provide a plurality of different optical signals (e.g., optical signals 514, 524, 534, and 544) to a plurality of receivers (e.g., receivers 250, 251, 252, and 253). As shown, multi-channel optical signal assembly apparatus 500 comprises structures similar to that of optical signal assembly 200 of FIG. 2, and those structures having the same identification numbers discussed below with respect to FIG. 5 may be substantially the same as those discussed above with respect to FIG. 2.

As shown, multi-channel optical signal assembly apparatus 500 is configured to receive an optical input signal 501 from an optical signal medium (e.g., a fiber optic cable) 205. Optical signal 501 can be provided to optical signal medium 205 via one or more optical transmitters configured to transmit the optical signal (or components thereof) over the optical signal medium 205. First lens 210 is configured to provide an optical signal 511 (having multiple wavelengths or wavelength bands) to first mirror 220' of optical signal assembly 550. First mirror 220' reflects a portion of optical signal 511 having a first wavelength or wavelength band and passes optical signal 512 to second mirror 230. First mirror 220' may also function as a polarization filter. Optical signal 512 is substantially optical signal 511, but with the light having the first wavelength or wavelength band removed. Second mirror 230 further reflects the reflected optical signal 512 to receiver 250. Prior to entering the receiver 250, optical signal 513 passes through filter 240 (e.g., a bandpass filter), which provides a filtered optical signal 514 (e.g., a signal having a smaller wavelength band around the first wavelength) to lens 245. Lens 245 may be configured to focus the filtered optical signal 514 onto a light-receiving device (e.g. a photodiode) in receiver 250.

As discussed above with respect to FIG. 2, first mirror 220' is positioned at an angle configured to reduce or minimize the sensitivity of a received optical signal (e.g., optical signal 511) to polarization, relative to a single mirror positioned at a 45° angle relative to optical signal 511. The angle of incidence of optical signal 511 at first mirror 220' may therefore be about 13°. Similarly, the second mirror 230 is positioned at an angle with respect to optical signal 512 (e.g., the angle of incidence) such that the sum of the angles of incidence of the first and second mirrors 220' and 230 is about 45°. This relationship of the sum of the angles of incidence of the first and second mirrors to the orientation of the optical signal medium 205 and the receiver 250 may be about 2:1 (e.g., when optical signal medium 205 and receiver 250 have about a 90° orientation to each other, the sum of the angles of incidence of the first and second mirrors may be about 45°). Thus, the angle of incidence of the second mirror 250 may be, e.g., 32° when the angle of incidence of the first mirror 220' is 13°. Except for the light beams 512, 513 and 514 having a single wavelength or wavelength band, the first optical assembly channel 550 operates substantially the same as optical assembly 200 in FIG. 2.

As also discussed above with respect to FIG. 2, first mirror 220' is configured to allow optical signal 521 (i.e., the portion of incident light beam 511 not having the first wavelength or wavelength band) to pass through (e.g., refract) to mirror 562 of second optical signal assembly 560. The optical signal which passes through first mirror 220' generally comprises light of a second wavelength or wavelength band, where the second wavelength or wavelength band is different from the first wavelength or wavelength band (e.g., the wavelength used by first optical signal assembly channel 550). The number of wavelengths or wavelength bands in optical signal portion 521 is at least the same as the number of channels in multi-channel optical signal assembly apparatus 500. The first and second wavelengths may differ by a minimum of about 100-200 nm, generally up to about 500-1000 nm. Alternatively, the first and second wavelengths may differ by at least about 5, 10, 15 or 20%, up to as much as 25, 50 or 100%.

Optical signal assembly 560 operates in a manner similar to that discussed above with respect to first optical signal assembly 550. That is, the structures in optical signal assembly 560 (e.g., first mirror 562, second mirror 564, filter 242, lens 247, and receiver 251) operate in a manner similar to those discussed above with respect to optical signal assembly 550 (e.g., first and second mirrors 220' and 230, filter 240, second lens 245, receiver 250, etc.). Specifically, first mirror 562 receives optical signal portion 521 (e.g., a refracted optical signal provided by first mirror 220' in optical signal assembly 550) and reflects a further optical signal portion 522 to second mirror 564. First mirror 562 may also function as a polarization filter. Optical signal portion 522 generally includes light of only the second wavelength or wavelength band. Second mirror 564 then reflects optical signal portion 522 to receiver 251. Prior to entering the receiver 251, optical signal portion 523 passes through filter 242 (e.g., a second bandpass filter, configured to filter light having wavelengths other than the second wavelength or wavelength band), which provides a filtered optical signal 524 to lens 247. Lens 247 may be configured to focus the filtered optical signal 524 onto a light-receiving device (e.g. a photodiode) in receiver 251. Receiver 251 can be similar to that of receiver 250 discussed above with respect to FIG. 2.

Similar to first mirror 220' in optical signal assembly 550, mirror 562 in optical signal assembly channel 560 is positioned at an angle configured to reduce or minimize the sensitivity of optical signal portion 521 to polarization, relative to a single mirror positioned at a 45° angle relative to optical signal 521. The angle of incidence of optical signal 521 at first mirror 220' may therefore be about 13°. Except for the optical signal portions 522, 523 and 524 having a different wavelength or wavelength band, the second optical assembly channel 560 operates substantially the same as first optical assembly channel 550.

Third optical signal assembly 570 operates in a manner similar to or substantially the same as first and second optical signal assemblies 550 and 560. Optical signal assembly 570 receives an optical signal portion 531 (e.g., a refracted optical signal provided by mirror 562) comprising light having a third wavelength or wavelength band different from the first and second wavelengths or wavelength bands. Utilizing a dual mirror configuration similar to that discussed above with respect to optical signal assemblies 550 and 560, optical signal assembly 570 provides an optical signal 534 to receiver 252 (e.g., similar to receiver 250 discussed above in FIG. 2).

Specifically, the first mirror 572 of the third optical signal assembly 570 receives optical signal portion 531 and reflects optical signal portion 532 to second mirror 574. The position of the first mirror 572 is configured to reduce the sensitivity of the optical signal portion 531 to polarization, relative to a single mirror positioned at a 45° angle relative to optical signal portion 531. The first mirror 572 may also function as a polarization filter and increase the degree of polarization of the optical signal portion 531. Second mirror 574 reflects optical signal portion 533 to receiver 252. Prior to entering the receiver 252, optical signal portion 533 passes through filter 244 (e.g., a bandpass filter), which filters optical signal portion 533 (e.g., reduces or narrows the wavelength band of reflected optical signal 533 around the third wavelength) and provides a filtered optical signal portion 534 to lens 249. Lens 249 may be configured to focus the filtered optical signal portion 534 onto a light-receiving device (e.g. a photodiode) in receiver 252.

Fourth optical signal assembly 580 also operates in a manner similar to or substantially the same as first, second and third optical signal assemblies 550, 560 and 570. Optical signal assembly 580 is configured to receive an optical signal 541 (e.g., a refracted light beam provided by mirror 572 in optical signal assembly 570) having a fourth wavelength different from the first, second, and third wavelengths at first mirror 582. As shown, mirror 582 does not provide (e.g., refract) an optical signal to any other optical assembly, as it is the final optical assembly in the series. Thus, mirror 582 reflects substantially all of the optical signal 541 to mirror 584, and optical signal 544 is provided to receiver 253 (e.g., similar to receiver 250 discussed above in FIG. 2).

Specifically, first mirror 582 of the fourth optical signal assembly 580 receives optical signal 541 and reflects optical signal portion 542 to second mirror 584. The position of the first mirror 582 is configured to reduce the sensitivity of the optical signal portion 541 to polarization, relative to a single mirror positioned at a 45° angle relative to optical signal portion 541. The first mirror 582 may also function as a polarization filter and increase the degree of polarization of the optical signal portion 542. Second mirror 584 reflects optical signal 543 to receiver 253. Prior to entering the receiver 253, optical signal 543 passes through filter 246 (e.g., a bandpass filter), which filters optical signal portion 543 (e.g., reduces or narrows the wavelength band of reflected optical signal 543 around the fourth wavelength) and provides a filtered optical signal portion 544 to lens 251. Lens 251 may be configured to focus the filtered optical signal portion 544 onto a light-receiving device (e.g. a photodiode) in receiver 253.

Therefore, the multi-channel optical signal assembly apparatus 500 can receive multiple optical signals (e.g., optical signals 514, 524, 534, and 544) at different wavelengths provided over a single-fiber optical medium (e.g., optical signal medium 205) with a minimal loss of power and/or intensity as a result of polarization of the optical signals, thereby maximizing the power and/or intensity of the received optical signals.

CONCLUSION/SUMMARY

Thus, the present invention provides methods and apparatuses for reducing the sensitivity of an optical signal or other light wave to polarization, thereby maximizing the bandwidth, power and/or intensity of the light wave. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A multi-channel optical signal assembly, comprising:
   a first filter at a first angle relative to an incident optical signal and configured to reflect light in the incident optical signal having a first wavelength, provide a first reflected optical signal, and allow light in the incident optical signal having at least a second wavelength to pass through the first filter, wherein the first angle is $13°\pm3°$;
   a first mirror at a second angle relative to the first reflected optical signal and configured to further reflect the first reflected optical signal and provide a second reflected optical signal;
   a first lens configured to focus and/or collimate the second reflected optical signal and provide a focused optical signal;
   a first receiver coupled to the first lens and configured to receive the focused optical signal;
   a second filter configured to receive the light in the incident optical signal having at least the second wavelength and reflect a portion of the light in the incident optical signal having the second wavelength at a same first angle as the first filter;
   a second mirror configured to further reflect the reflected portion of the light in the incident optical signal having the second wavelength at a same second angle as the first mirror to a second receiver;
   a second lens configured to focus and/or collimate the further reflected portion of the light in the incident optical signal having the second wavelength; and
   a second receiver coupled to the second lens and configured to receive the focused and/or collimated further reflected portion of the light in the incident optical signal.

2. The multi-channel optical signal assembly of claim 1, wherein the incident optical signal is a diffuse optical signal.

3. The multi-channel optical signal assembly of claim 1, wherein the second angle is greater than the first angle.

4. The multi-channel optical signal assembly of claim 1, wherein the sum of the first and second angles is about 45°.

5. The multi-channel optical signal assembly of claim 4, wherein the second angle is $32°\pm4$.

6. The multi-channel optical signal assembly of claim 1, further comprising a bandpass filter, configured to reduce or narrow a wavelength band of the incident optical signal, the second reflected signal, and/or the focused optical signal.

7. The multi-channel optical signal assembly of claim 6, wherein a sum of the first and second angles is $45°\pm5°$.

8. A transceiver comprising:
   the multi-channel optical signal assembly of claim 1; and
   a transmitter configured to provide an output optical signal to an optical medium.

9. The transceiver of claim 8, wherein the optical medium comprises an optical fiber providing the incident optical signal, the transmitter being configured to transmit the output optical signal to the optical fiber.

10. The transceiver of claim 9, wherein the first filter is configured to allow light having a different wavelength from the first wavelength to pass through the first filter, the output optical signal has the different wavelength, and the transmitter is configured to transmit the output optical signal through the first filter.

11. The transceiver of claim 8, wherein the first receiver comprises (i) a first photodiode configured to receive the focused-optical signal, and (ii) first circuitry in electrical communication with the first photodiode.

12. The multi-channel optical signal assembly of claim 1, wherein the first filter comprises a wavelength selective filter.

13. The multi-channel optical signal assembly of claim 1, wherein a sum of the first and second angles is $45°\pm5°$.

14. The multi-channel optical signal assembly of claim 1, wherein the second angle is $32°\pm4°$.

15. The multi-channel optical signal assembly of claim 1, further comprising a third filter configured to reflect a portion of optical signal having a third wavelength at the first angle, a third mirror configured to further reflect the reflected optical signal having the third wavelength at the second angle to a third receiver, a fourth filter configured to reflect a portion of optical signal having a fourth wavelength at the first angle, and a fourth mirror configured to further reflect the reflected optical signal having the fourth wavelength at the second angle to a fourth receiver.

16. The multi-channel optical signal assembly of claim 1, wherein the first receiver is configured to convert the focused optical signal into a first electrical signal, and the second receiver is configured to convert the focused and/or collimated further reflected optical signal into a second electrical signal.

17. The multi-channel optical signal assembly of claim 16, wherein each of the first and second receivers comprises a photodiode.

18. The transceiver of claim 11, wherein the second receiver comprises (i) a second photodiode configured to receive the focused and/or collimated further reflected optical signal, and (ii) second circuitry in electrical communication with the second photodiode.

19. A multi-channel optical signal assembly, comprising:
   a first filter at a first angle relative to an incident optical signal and configured to reflect light in the incident optical signal having a first wavelength, provide a first reflected optical signal, and allow light in the incident optical signal having at least a second wavelength to pass through the first filter, wherein the first angle reduces sensitivity of the incident optical signal to polarization relative to a single mirror configured to reflect the incident optical signal at a 45° angle relative to the incident optical signal;

a first mirror at a second angle relative to the first reflected optical signal and configured to further reflect the first reflected optical signal and provide a second reflected optical signal;

a first lens configured to focus and/or collimate the second reflected optical signal and provide a focused optical signal;

a first receiver coupled to the first lens and configured to receive the focused optical signal;

a second filter configured to receive the light in the incident optical signal having at least the second wavelength and reflect a portion of the light in the incident optical signal having the second wavelength at a same first angle as the first filter;

a second mirror configured to further reflect the reflected portion of the light in the incident optical signal having the second wavelength at a same second angle as the first mirror to a second receiver;

a second lens configured to focus and/or collimate the further reflected portion of the light in the incident optical signal having the second wavelength;

a second receiver coupled to the second lens and configured to receive the focused and/or collimated further reflected portion of the light in the incident optical signal;

a third filter configured to reflect a portion of optical signal having a third wavelength at the first angle;

a third mirror configured to further reflect the reflected optical signal having the third wavelength at the second angle to a third receiver;

a fourth filter configured to reflect a portion of optical signal having a fourth wavelength at the first angle; and a fourth mirror configured to further reflect the reflected optical signal having the fourth wavelength at the second angle to a fourth receiver.

20. The multi-channel optical signal assembly of claim 19, wherein the first angle is 13°±3°.

* * * * *